United States Patent
Hu

(10) Patent No.: US 8,180,150 B2
(45) Date of Patent: *May 15, 2012

(54) METHOD AND APPARATUS PROVIDING AUTOMATIC COLOR BALANCING FOR DIGITAL IMAGING SYSTEMS

(75) Inventor: Shane C. Hu, Fremont, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 12/915,665

(22) Filed: Oct. 29, 2010

(65) Prior Publication Data

US 2011/0037873 A1    Feb. 17, 2011

Related U.S. Application Data

(63) Continuation of application No. 11/302,126, filed on Dec. 14, 2005, now Pat. No. 7,848,569.

(51) Int. Cl.
*G06K 9/00* (2006.01)
(52) U.S. Cl. .................................................... 382/167
(58) Field of Classification Search .................... None
See application file for complete search history.

(56) References Cited

U.S. PATENT DOCUMENTS

| | | | |
|---|---|---|---|
| 4,602,277 A | 7/1986 | Guichard | |
| 5,115,327 A | 5/1992 | Ishima | |
| 5,274,439 A | 12/1993 | Dischert et al. | |
| 5,489,939 A * | 2/1996 | Haruki et al. | 348/223.1 |
| 5,907,629 A | 5/1999 | Funt et al. | |
| 6,140,630 A | 10/2000 | Rhodes | |
| 6,192,152 B1 * | 2/2001 | Funada et al. | 382/199 |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,628,830 B1 * | 9/2003 | Yamazoe et al. | 382/168 |
| 6,681,042 B1 * | 1/2004 | Weldy | 382/167 |
| 6,754,381 B2 | 6/2004 | Kuwata | |
| 6,774,938 B1 * | 8/2004 | Noguchi | 348/225.1 |
| 6,850,272 B1 | 2/2005 | Terashita | |
| 6,853,748 B2 | 2/2005 | Endo et al. | |
| 6,906,744 B1 * | 6/2005 | Hoshuyama et al. | 348/223.1 |
| 6,937,774 B1 | 8/2005 | Specht et al. | |

(Continued)

FOREIGN PATENT DOCUMENTS

JP    60-500116 A    1/1985

(Continued)

OTHER PUBLICATIONS

R.W.G. Hunt, "The Reproduction of Colour", 4th Ed. 1987, Section 16.7 (pp. 294-296), Fountain Press, ISBN 0-86343-088-0, Tolworth, England, Great Britain.

(Continued)

*Primary Examiner* — Yuzhen Ge
(74) *Attorney, Agent, or Firm* — Dickstein Shapiro LLP

(57) ABSTRACT

Pixels from an image are sampled for gray world statistics. To avoid the effect of saturated regions, the pixels are pruned. If a predetermined percentage of the pixels are included in the gray world statistics, color channel gain is calculated and applied to the image. As a result, color balance is achieved in a simple and efficient manner.

24 Claims, 5 Drawing Sheets

U.S. PATENT DOCUMENTS

| | | | |
|---|---|---|---|
| 7,162,078 B2 | 1/2007 | Cheng | |
| 7,173,663 B2 | 2/2007 | Skow et al. | |
| 7,227,586 B2 | 6/2007 | Finlayson et al. | |
| 7,283,667 B2 | 10/2007 | Takeshita | |
| 7,319,483 B2 | 1/2008 | Park et al. | |
| 7,319,544 B2 * | 1/2008 | Sharman | 358/1.9 |
| 7,336,308 B2 * | 2/2008 | Kubo | 348/296 |
| 7,423,779 B2 | 9/2008 | Shi | |
| 7,480,421 B2 * | 1/2009 | Henley | 382/274 |
| 7,515,181 B2 * | 4/2009 | Terashita | 348/231.6 |
| 7,961,227 B2 * | 6/2011 | Arakawa | 348/223.1 |
| 2003/0063197 A1 | 4/2003 | Sugiki | |
| 2003/0151758 A1 | 8/2003 | Takeshita | |
| 2004/0119854 A1 | 6/2004 | Funakoshi et al. | |
| 2004/0120575 A1 | 6/2004 | Cheng | |
| 2004/0202365 A1 | 10/2004 | Spaulding et al. | |
| 2005/0068330 A1 | 3/2005 | Speigle et al. | |
| 2005/0069200 A1 | 3/2005 | Speigle et al. | |
| 2005/0069201 A1 | 3/2005 | Speigle et al. | |
| 2005/0122408 A1 | 6/2005 | Park et al. | |
| 2005/0219379 A1 | 10/2005 | Shi | |

FOREIGN PATENT DOCUMENTS

| | | |
|---|---|---|
| JP | 11-331738 A | 11/1999 |
| JP | 2003-87818 A | 3/2003 |
| JP | 2004-328564 | 11/2004 |
| JP | 2004-328564 A | 11/2004 |
| JP | 2005-109705 A | 4/2005 |
| JP | 2005-167956 A | 6/2005 |

OTHER PUBLICATIONS

Wyszecki and Stiles, "Color Science Concepts and Methods, Quantitative Data and Formulae", 2nd Ed. 2000, Sections 3.2-3.3 (pp. 117-175), John Wiley & Sons, Inc., ISBN 0-471-39918-3, New York, New York.

English translation of Japanese patent document 2004-328564, translation is computer generated, the Japanese patent document is also furnished.

Examine Report and Written Opinion issued by International Bureau Jul. 18, 2004.

* cited by examiner

METHOD AND APPARATUS PROVIDING
AUTOMATIC COLOR BALANCING FOR
DIGITAL IMAGING SYSTEMS

CROSS REFERENCE TO RELATED
APPLICATIONS

The present application is a continuation of U.S. patent application Ser. No. 11/302,126 filed on Dec. 14, 2005 now U.S. Pat. No. 7,848,569, which is incorporated by reference in its entirety.

FIELD OF THE INVENTION

The invention relates to imaging devices and more particularly to automatic color balancing techniques for imaging systems.

BACKGROUND OF THE INVENTION

Solid state imagers, including charge coupled devices (CCD), CMOS imagers and others, have been used in photo imaging applications. A solid state imager circuit includes a focal plane array of pixel cells, each one of the cells including a photosensor, which may be a photogate, photoconductor or a photodiode having a doped region for accumulating photo-generated charge. Each pixel cell has a charge storage region, formed on or in the substrate, which is connected to the gate of an output transistor that is part of a readout circuit. The charge storage region may be constructed as a floating diffusion region. In some imager circuits, each pixel cell may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state; (4) transfer of charge to the storage region; (5) selection of a pixel cell for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

Color constancy is one of the characteristics of the human vision system. The human vision system is very capable of discriminating color objects under different lighting conditions. The color of an object looks substantially the same under vastly different types of natural and artificial light sources, such as sun light, moon light, incandescent, fluorescent, and candle light. However, due to the change in the spectral power distribution of the illumination, the perceived lightness and color appearance of the scene will change. The human vision system does not remove the influence of the light source completely.

A possible explanation is that the human vision system does not function as an absolute colorimetric device. The perceived images contain interactions of light sources and object reflectance. Therefore, for a captured image from an imaging device to look natural, the influence of the light source must be preserved in a manner similar to the way the human vision system functions. For example, the reproduced sunset scene must look like a sunset scene. This hypothesis is supported by R. W. G. Hunt's observation that a more pleasing effect is often produced in color prints if they are so made that instead of the color balance being correct, in which gray is printed as gray, it is so adjusted that the whole picture integrates to gray. R. W. G. Hunt, "The Reproduction of Colour" §16.7. The gray world theory assumes that all of the colors in a picture should integrate, i.e. average, to gray. Accordingly, there is a need and desire for an imaging device that more accurately color balances a captured image.

BRIEF SUMMARY OF THE INVENTION

The invention provides a color balancing method and apparatus by which an image's color balance under different illuminations can be more closely maintained. According to an exemplary embodiment of the invention, pixels from an input image having an imager color space, for example, a red-green-blue (RGB) color space, are sampled for gray world statistics. To avoid the effect of saturated regions, the pixels are pruned. If a predetermined percentage of the pixels are included in the gray world statistics, gain is then computed for each RGB channel with respect to a neutral white point. Channel gains are applied to the RGB image. This process creates a transformed color balanced image suitable for display.

The invention may be implemented to operate on analog or digital image data and may be executed in hardware, software, or a combination of the two.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following description, an exemplary imager color space will be described as an RGB color space; however, other color imaging protocols could be used in the invention, including, for example, a subtractive CMYK (cyan, magenta, yellow, black) color space.

Figure 1:
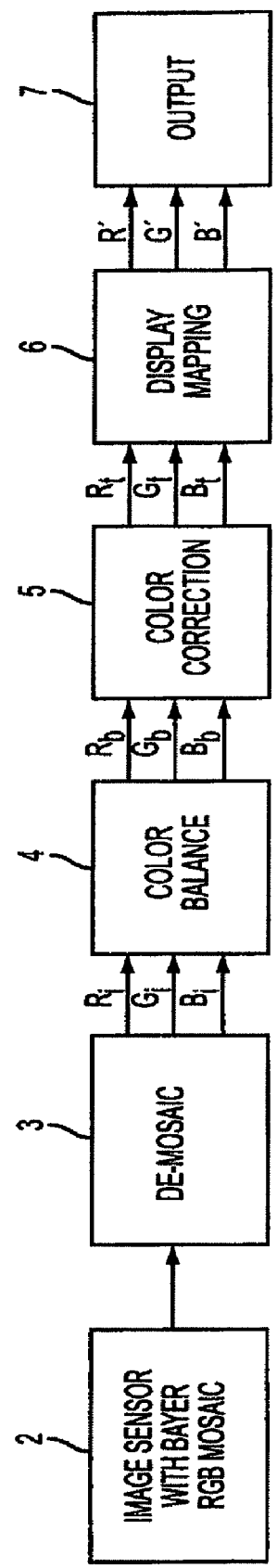
FIG. 1 shows a functional block diagram illustrating a color balancing process according to an exemplary embodiment of the invention.
Figure 3:
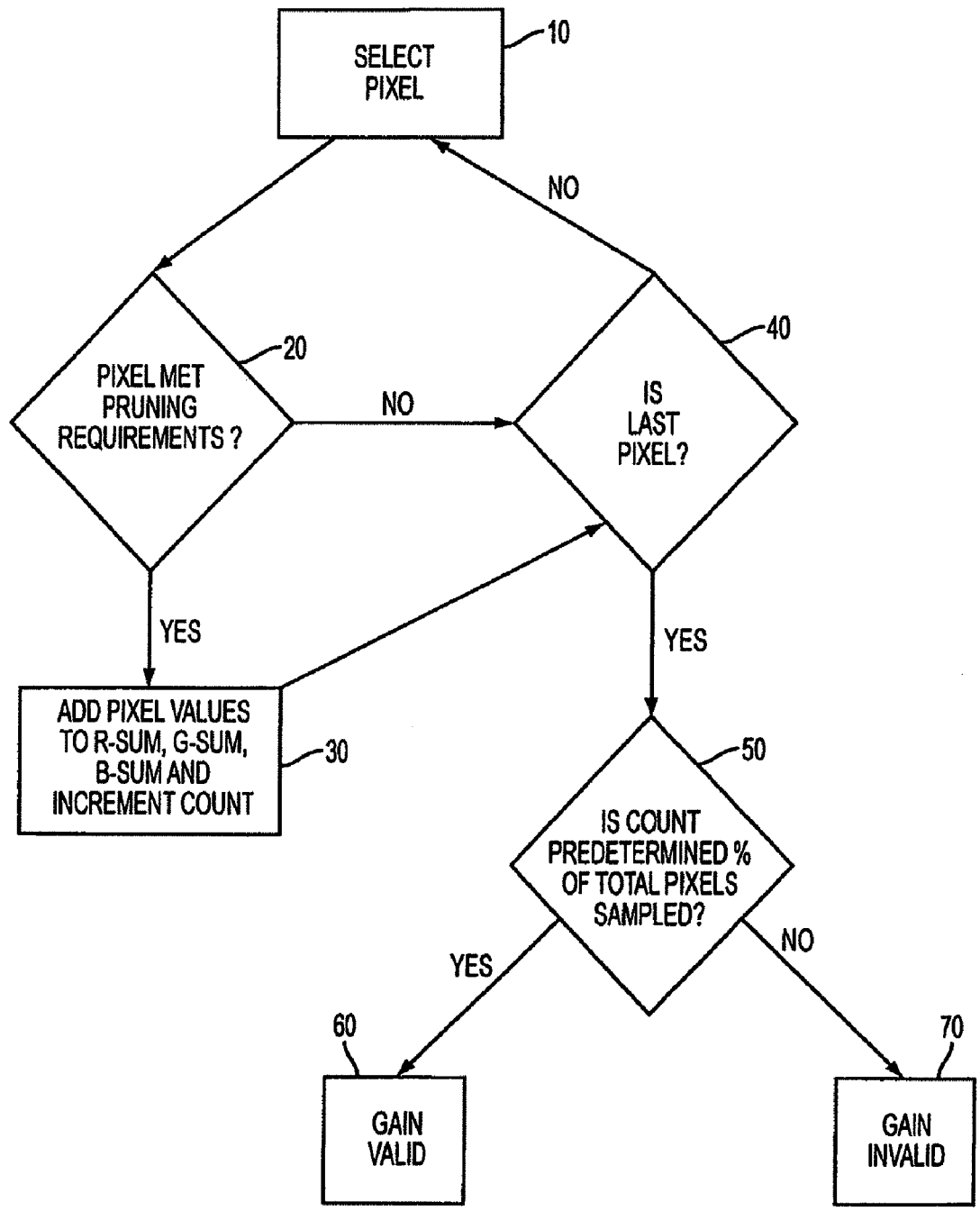
FIG. 3 shows a flowchart illustrating portions of the process illustrated in FIG. 2 in greater detail.

The general processing flow of the invention is now explained with reference to the figures. Referring to FIG. 1, image sensor data from an RGB color space is acquired from an image sensor 2 using a tiled color filter array, such as a Bayer mosaic filter pattern. A de-mosaic process 3, interpolating the tiled Bayer-RBG signal, is applied to produce Ri, Gi, and Bi signals. The Ri, Gi, and Bi signals are color balanced in process 4 to produce Rb, Gb, and Bb signals by gathering chromaticity statistics of the image and calculating channel gains as explained below in more detail with reference to FIGS. 3 and 4. The Rb, Gb, and Bb signals are then subjected to a color correction process 5 to produce Rt, Gt, and Bt signals by applying a conventional color correction scheme. Display mapping 6 is applied to the color corrected signals Rt, Gt, and Bt signals to produce R', G', and B' signals suitable for displaying or otherwise outputting of the RGB image at output process 7. It should be appreciated that any known mosaic, de-mosaic, color correction, display mapping, and display techniques may be respectively used in processing blocks 2, 3, 5, 6, and 7.

Figure 2:
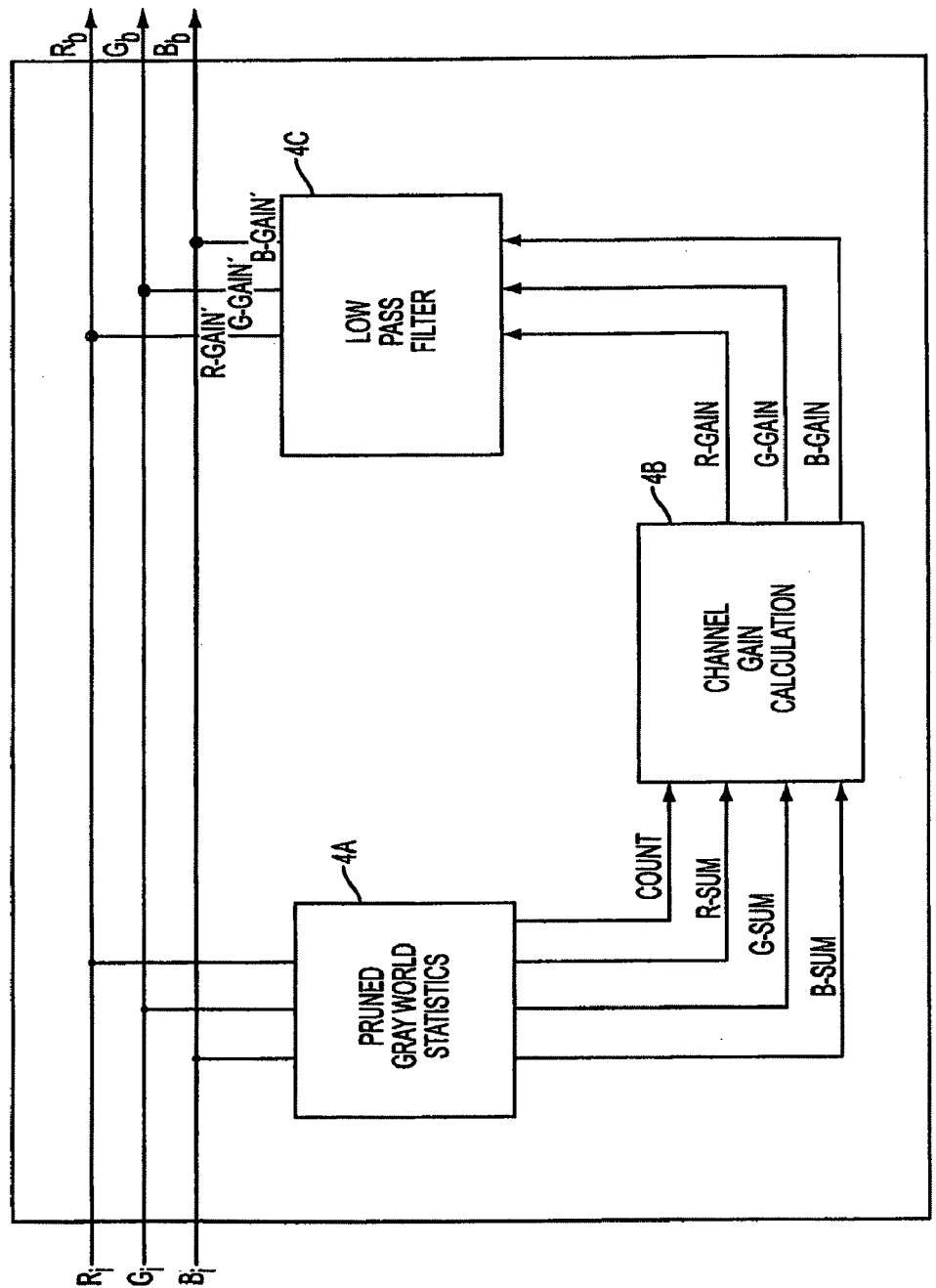
FIG. 2 shows a functional block diagram illustrating portions of the process illustrated in FIG. 1 in greater detail.

The color balance process of block 4 of FIG. 1 is now explained in more detail with respect to FIG. 2. First, pruned gray world statistics, R_Sum, G_Sum, B_Sum, and Count are calculated in process 4a. Then channel gains R_Gain, G_Gain, and B_Gain are calculated in process block 4b and applied to input signals Ri, Gi, and Bi to produce color balanced image data, Rb, Gb, and Bb.

The process illustrated in FIG. 2 is described below in further detail in relation to an exemplary embodiment of the invention. Referring first to processing block 4a, gray world statistics can be derived by integrating the input image to gray. See "The Reproduction of Colour" by R. W. G. Hunt, 4th Edition 1987 Fountain Press, ISBN 0-86343-088-0, the disclosure of which is incorporated herein by reference. In an exemplary embodiment of the invention, every pixel of the input image is sampled by processing block 4a for integration to gray. The sums of the chromaticity of the color channels of each pixel (R_SUM, G_SUM, and B_SUM) are calculated in processing block 4a and then used to calculate the chromaticity of the gray world summary in processing block 4b. The chromaticity of the gray world summary is defined as follows, the red value, GW_CR=R_SUM/(R_SUM+G_SUM+B_SUM); the green value, GW_CG=G_SUM/(R_SUM+G_SUM+B_SUM); and the blue value, GW_CB=B_SUM/(R_SUM+G_SUM+B_SUM). In an exemplary embodiment, the chromaticity of all three components sums up to one. In other words, GW_CR+GW_CG+GW_CB=1. It should be appreciated that any known pixel-selection method may be employed in processing block 4a, including but not limited to random sampling of pixels in the image, or alternatively, any method or operation that tends to select pixels.

The accuracy of the gray world summary, can be further improved by pruning, i.e., excluding obvious outliers, such as pixels near saturation, to compensate for fully saturated color objects, etc. An exemplary pruning process is shown by the flowchart in FIG. 3. Initially, a pixel is selected (step 10). In the exemplary pruning process, a pixel is included in the gray world statistics, if a green value is higher than a preset low value (LOW_GREEN_VALUE) and lower than a preset high value (HIGH_GREEN_VALUE); the red value is higher than a preset low fraction (LOW_RED_GREEN_FRACTION) of the green value and lower than a preset high fraction (HIGH_RED_GREEN_FRACTION) of the green value; and the blue value is higher than a preset low fraction (LOW_BLUE_GREEN_FRACTION) of the green value and lower than a preset high fraction (HIGH_BLUE_GREEN_FRACTION) of the green value. These tests are performed in step 20 of FIG. 3.

If the pixel passes the criteria listed above (step 20), the red, green, and blue values of the pixel are added to the grand total of each component respectively, R_SUM, G_SUM, and B_SUM, and a valid pixel count, COUNT, is incremented (step 30). If the selected pixel is not the last pixel for sampling (step 40), the next pixel is selected (step 10), and the pruning criteria determination is performed again (step 20). The same operational steps, as described above with reference to FIG. 3, are performed until it is determined that the last pixel to be included in the gray world statistics has been selected (step 40). If at step 20, it is determined that the pixel does not meet the pruning criteria, step 40 is executed as described above.

Once it is determined that a selected pixel is the last pixel from an image for sampling (yes at step 40), the color balance system determines at step 50 if COUNT is a predetermined percentage of the total number of image pixels sampled, for example, equal to or greater than a quarter of the total pixels sampled. If COUNT is equal to or greater than the predetermined percentage of the total number of image pixels sampled, then the color channel gains are deemed valid (step 60) and should be calculated in process block 4b and applied to the image data, Ri, Gi, and Bi. Otherwise, the gain is deemed invalid and the color channels remain unchanged (step 70). It should be noted that step 50, i.e., determining if COUNT is a predetermined percentage of the total pixels sampled, can occur after channel gain is calculated, although it is more efficient to make the determination before channel gain is calculated.

The calculation of the channel gain in processing block 4b (FIG. 2) revolves around balancing the chromaticity of the gray world summary against the chromaticity of a predetermined neutral white point. Chromaticity is defined in a concept similar to the known CIE XYZ standard observer tristimulus colorimetric system. See "Color Science Concepts and Methods, Quantitative Data and Formulae" by Wyszecki and Stiles, Wiley, ISBN 0-471-39918-3, the disclosure of which is incorporated herein by reference. The image sensor's spectral response is usually not the same as the CIE standard observer. The neutral white point of the sensor needs to be calibrated against known light sources because color balance is dependant on scene illuminant.

The chromaticity of the neutral white point is determined in processing block 4b. The determination can be automatically calculated as a spectral response of the image sensor, preset based on the user's preference, or a combination of the two. It should be appreciated that any known method for selecting a neutral white point may be used. The chromaticity of the neutral white point is comprised of three components, the red value, N_CR, the green value, N_CG, and the blue value, N_CB. In a preferred embodiment, the chromaticity of all three components sums up to one. In other words, N_CR+N_CG+N_CB=1.

In a preferred embodiment, a system tuning parameter, G_BIAS, may be used in processing block 4b to fine tune the rendered image with respect to the color channel sensitivity of the image sensor. G_BIAS can be automatically calculated with respect to the color channel sensitivity of the image sensor, preset based on the user's preference, or a combination of the two. It should be appreciated that any known method for selecting a system tuning parameter may be used.

In an embodiment of the present invention, green channel gain, G_GAIN, is calculated as a function of the chromaticity of a neutral white point (N_CR, N_CG, N_CB), the chromaticity of the gray world summary (GW_CR, GW_CG, GW_CB), and an optional system tuning parameter (G_BIAS). Rather than independently calculating the red channel gain, the red channel gain is calculated as a function of the green channel gain. Finally, the blue channel gain is calculated as a function of the red and green channel gains. In one embodiment of the invention, the above mentioned parameters are used to calculate the gain for each color channel in processing block 4b as follows:

$$G\_GAIN = \frac{GW\_CR + GW\_CB + G\_BIAS}{N\_CR + N\_CB + G\_BIAS} \quad (1)$$

$$R\_GAIN = \frac{\frac{GW\_CG}{G\_GAIN} + GW\_CB}{N\_CG + N\_CB} \quad (2)$$

$$B\_GAIN = \frac{\frac{GW\_CR}{R\_GAIN} + \frac{GW\_CG}{G\_GAIN}}{N\_CR + N\_CG} \quad (3)$$

A preferred embodiment recursive calculations of the channel gains are performed in processing block 4b, allowing for more complete normalization of the channel gains. The recursive calculation consists of the calculations of Equations (1), (2), and (3) and the following recursive calculations, which can be repeated as many times as desired:

$$G\_GAIN' = \frac{(GW\_CR * R\_GAIN) + (GW\_CB * B\_GAIN) + G\_BIAS}{N\_CR + N\_CB + G\_BIAS} \quad (4)$$

$$R\_GAIN' = \frac{\frac{GW\_CG}{G\_GAIN} + \frac{GW\_CB}{B\_GAIN}}{N\_CG + N\_CB} \quad (5)$$

$$B\_GAIN' = \frac{\frac{GW\_CR}{R\_GAIN} + \frac{GW\_CG}{G\_GAIN}}{N\_CR + N\_CB} \quad (6)$$

In a preferred embodiment, the channel gains calculated in either Equations (1), (2), and (3) or Equations (4), (5), and (6), now represented as R_GAIN, G_GAIN, B_GAIN for simplicity, are normalized in processing block 4b to minimize the variation of the luminance signal while maintaining the ratio between the color channel gains. Since the green channel constitutes the majority of the luminance signal; the variation of the luminance signal is minimized by setting the green channel gain to 1.0 and the red channel gain and the blue channel gain are recalculated while maintaining the ratio between the red, green, and blue channel gains. This is accomplished by:

$$G\_GAIN' = 1.0 \quad (7)$$

$$R\_GAIN' = \frac{R\_GAIN}{G\_GAIN} \quad (8)$$

$$B\_GAIN' = \frac{B\_GAIN}{G\_GAIN} \quad (9)$$

In a preferred embodiment, the red, green, and blue channel gains calculated in processing block 4b and described above are used to respectively adjust the signals Ri, Gi, and Bi in processing block 4 to produce signals Rb, Gb, and Bb. For single picture snapshot applications, the derived channel gains can be applied for the subsequent color processing stages. For video applications, where video data flow needs to be continuous, the new channel gains for each frame can be stored in processing block 4c and can be applied for the next frame. If a smoother transition is desired, a low pass filtering of the channel gains can be implemented by storing multiple past channel gains and performing a low pass filtering of the past and current channel gains. The low pass filtering can be implemented by a running mean or moving average filter, as shown in processing block 4c. It should be appreciated that any known low pass filtering method may be used.

As is apparent from the above description, the invention achieves significant color balance, is straightforward, and is relatively easy to implement. As a result, color balance is achieved in a simple and efficient manner.

Figure 4:
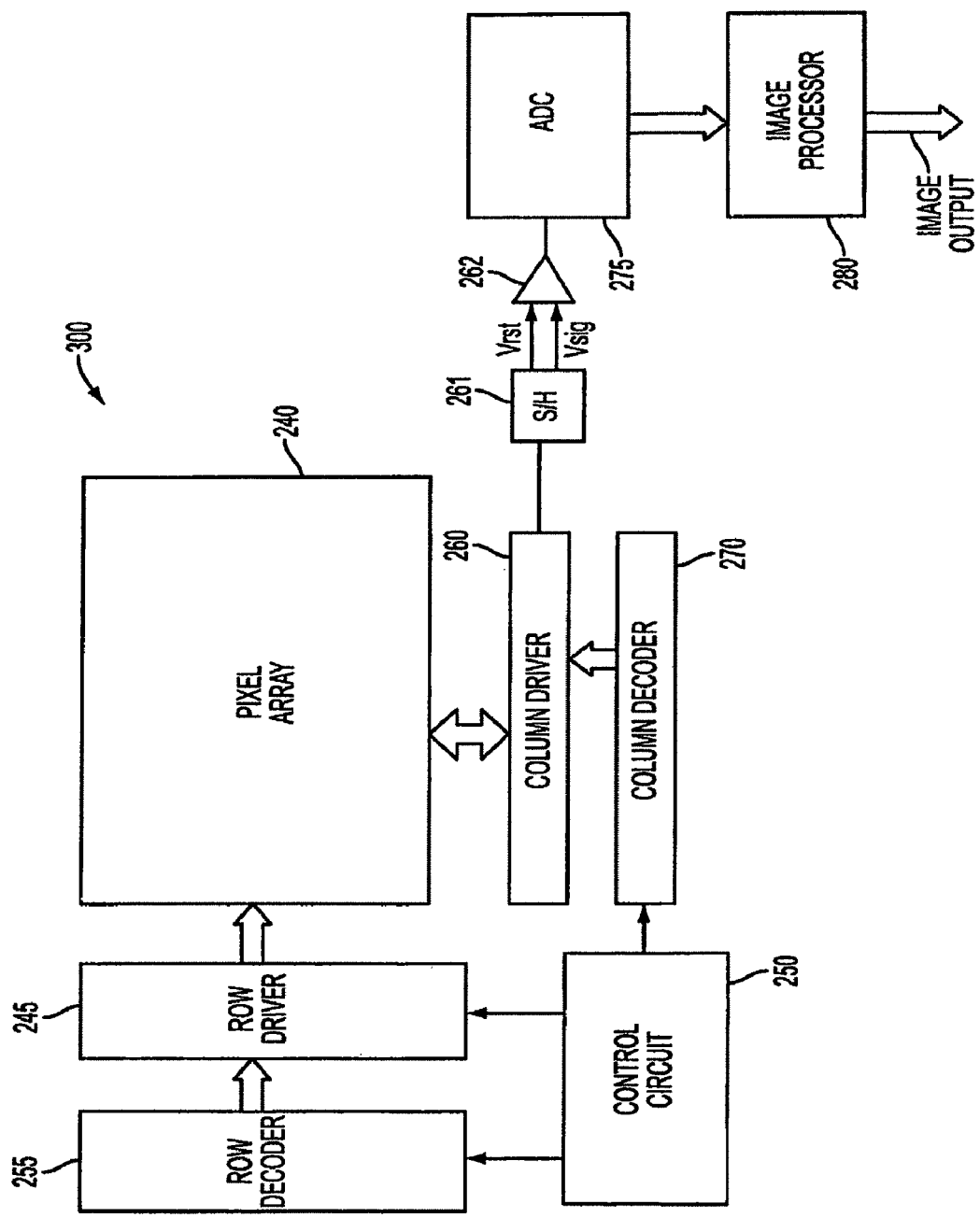
FIG. 4 shows a block diagram of an imager constructed in accordance with an exemplary embodiment of the invention.

FIG. 4 illustrates an exemplary imaging device 300 having a pixel array 240 suitable for providing the processing illustrated in block 2 of FIG. 1. The FIG. 4 imaging device employs a Bayer filter and produces R, G, B, pixel output signals. Row lines of the array 240 are selectively activated by a row driver 245 in response to row address decoder 255. A column driver 260 and column address decoder 270 are also included in the imaging device 300. The imaging device 300 is operated by the timing and control circuit 250, which controls the address decoders 255, 270. The control circuit 250 also controls the row and column driver circuitry 245, 260.

A sample and hold circuit 261 associated with the column driver 260 reads a pixel reset signal Vrst and a pixel image signal Vsig for selected pixels of the array 240. A differential signal (Vrst-Vsig) is produced by differential amplifier 262 for each pixel and is digitized by analog-to-digital converter 275 (ADC). The analog-to-digital converter 275 supplies the digitized pixel signals to an image processor 280 which forms and may output a digital image. The image processor 280 has a circuit (e.g., processor) that is capable of performing the color balance processing (FIG. 1, block 4) of the invention on pixel array 240.

Alternatively, the color balance processing can be done on the analog output of the pixel array by a hardwired or logic circuit (not shown) located between the amplifier 262 and ADC 275 or on the digital image output of the image processor 280, in software or hardware, by another device.

Figure 5:
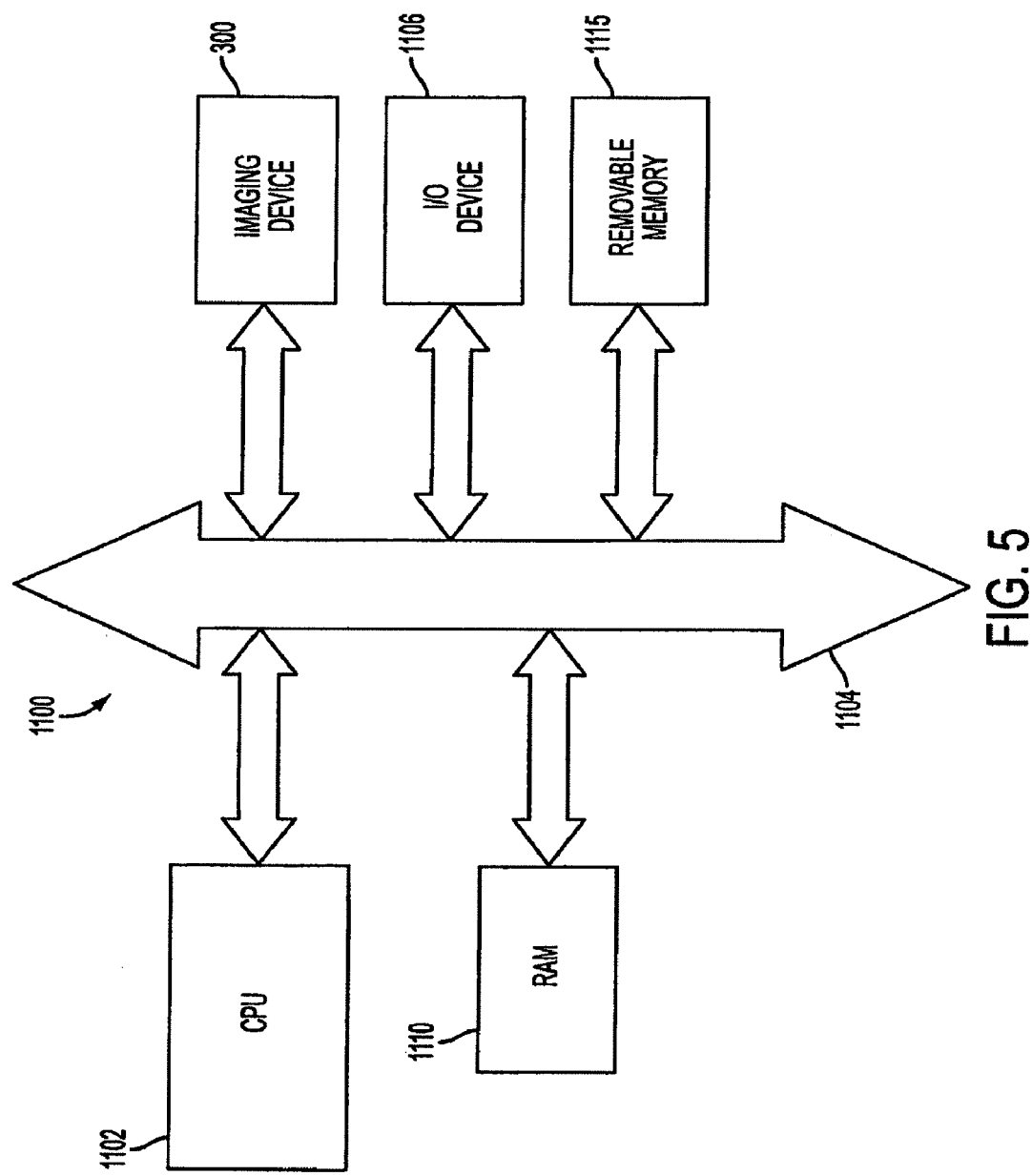
FIG. 5 shows a processor system incorporating at least one imaging device including circuitry for computing color balance constructed in accordance with an embodiment of the invention.

FIG. 5 shows system 1100, a typical processor system modified to include the imaging device 300 (FIG. 4) incorporating the color balance methods according to the invention. The system 1100 is exemplary of a system having digital circuits that could include image sensor devices. Without being limiting, such a system could include a computer system, still or video camera system, scanner, machine vision, video phone, and auto focus system, or other imager systems.

System 1100, for example a camera system, generally comprises a central processing unit (CPU) 1102, such as a microprocessor, that communicates with an input/output (I/O) device 1106 over a bus 1104. Imaging device 300 also communicates with the CPU 1102 over the bus 1104. The processor-based system 1100 also includes random access memory (RAM) 1110, and can include removable memory 1115, such as flash memory, which also communicate with the CPU 1102 over the bus 1104. The imaging device 300 may be combined with a processor, such as a CPU, digital signal processor, or microprocessor, with or without memory storage on a single integrated circuit or on a different chip than the processor.

While preferred embodiments of the invention have been described and illustrated above, it should be understood that these are exemplary of the invention and are not to be considered as limiting. For example, although an exemplary embodiment has been described in connection with a CMOS image sensor, the invention is applicable to other electronic image sensors, such as CCD image sensors, for example. Additions, deletions, substitutions, and other modifications can be made without departing from the spirit or scope of the invention. Accordingly, the invention is not to be considered as limited by the foregoing description but is only limited by the scope of the appended claims.

What is claimed as new and desired to be protected by Letters Patent of the United States is:

1. A method of transforming input image data from an image sensor, said input image data having a plurality of pixels corresponding to a plurality of color channels, said method comprising:

calculating a color channel gain for a first color channel of said plurality of color channels using a processing circuit by dividing a sum of gray world summary chromaticity values corresponding to the other color channels of said plurality of color channels by a sum of chromaticity values representing a neutral white point; and applying the color channel gain to said first color channel of said input image data.

2. The method of claim 1, further comprising using said processing circuit to calculate color channel gains for each other respective color channel of said plurality of color channels based on said calculated color channel gain for said first color channel.

3. The method of claim 1, further comprising pruning pixel values from pixels of said input image data that are used in calculating the gray world summary chromaticity values based on predetermined criteria.

4. The method of claim 1, further comprising using a system tuning parameter to fine tune said color channel gain with respect to a color channel sensitivity of the image sensor.

5. The method of claim 1, further comprising recursively recalculating said color channel gain.

6. The method of claim 2, wherein said plurality of color channels include red R, green G, and blue B color channels, and wherein said color channel gains are calculated according to:

$$G\_GAIN = \frac{GW\_CR + GW\_CB}{N\_CR + N\_CB},$$

$$R\_GAIN = \frac{\frac{GW\_CG}{G\_GAIN} + GW\_CB}{N\_CG + N\_CB}, \text{ and}$$

$$B\_GAIN = \frac{\frac{GW\_CR}{R\_GAIN} + \frac{GW\_CG}{G\_GAIN}}{N\_CR + N\_CG},$$

wherein:
G_GAIN is a color channel gain for the green color channel, R_GAIN is a color channel gain for the red color channel, and B_GAIN is a color channel gain for the blue color channel;
GW_CR, GW_CB, and GW_CG are said gray world summary chromaticity values of said red, blue, and green color channels, respectively; and
N_CR, N_CB, and N_CG are said chromaticity values representing said neutral white point.

7. The method of claim 6, further comprising the act of recursively calculating said color channel gains according to:

$$G\_GAIN' = \frac{(GW\_CR * R\_GAIN) + (GW\_CB * B\_GAIN)}{N\_CR + N\_CB},$$

$$R\_GAIN' = \frac{\frac{GW\_CG}{R\_GAIN} + \frac{GW\_CB}{B\_GAIN}}{N\_CG + N\_CB}, \text{ and}$$

$$B\_GAIN' = \frac{\frac{GW\_CR}{R\_GAIN} + \frac{GW\_CG}{G\_GAIN}}{N\_CR + N\_CB},$$

wherein G_GAIN' is a recalculated color channel gain for said green color channel; R_GAIN' is a recalculated color channel gain for said red color channel, and B_GAIN' is a recalculated color channel gain for said blue color channel.

8. The method of claim 1, wherein said plurality of color channels include red R, green G, and blue B color channels, and wherein said color channel gains are calculated according to:

$$G\_GAIN = \frac{GW\_CR + GW\_CB + G\_BIAS}{N\_CR + N\_CB + G\_BIAS},$$

$$R\_GAIN = \frac{\frac{GW\_CG}{G\_GAIN} + GW\_CB}{N\_CG + N\_CB}, \text{ and}$$

$$B\_GAIN = \frac{\frac{GW\_CR}{R\_GAIN} + \frac{GW\_CG}{G\_GAIN}}{N\_CR + N\_CG},$$

wherein:
G_GAIN is a color channel gain for the green color channel, R_GAIN is a color channel gain for the red color channel, and B_GAIN is a color channel gain for the blue color channel;
GW_CR, GW CB, and GW_CG represent said gray world summary chromaticity values of said red, blue, and green color channels, respectively;
N_CR, N_CB, and N_CG are said chromaticity values representing said neutral white point; and
G_BIAS represents a tuning parameter.

9. The method of claim 8, further comprising the act of recursively calculating said color channel gains according to:

$$G\_GAIN' = \frac{(GW\_CR * R\_GAIN) + (GW\_CB * B\_GAIN) + G\_BIAS}{N\_CR + N\_CB + G\_BIAS},$$

$$R\_GAIN' = \frac{\frac{GW\_CG}{G\_GAIN} + \frac{GW\_CB}{B\_GAIN}}{N\_CG + N\_CB}, \text{ and}$$

$$B\_GAIN' = \frac{\frac{GW\_CR}{R\_GAIN} + \frac{GW\_CG}{G\_GAIN}}{N\_CR + N\_CB},$$

wherein G_GAIN' is a recalculated color channel gain for said green color channel; R_GAIN' is a recalculated color channel gain for said red channel, and B_GAIN' is a recalculated color channel gain for said blue color channel.

10. The method of claim 2, further comprising normalizing said calculated color channel gains.

11. The method of claim 2, further comprising:
storing a predetermined number of said calculated color channel gains for each respective color channel; and
calculating an average color channel gain for each respective color channel by averaging the predetermined number of stored color channel gains for said respective color channel.

12. The method of claim 1, wherein said processing circuit comprises at least one of:
   a processor;
   a logic circuit; and
   hardwired circuitry.

13. The method of claim 1, wherein said input image data from said image sensor is analog image data.

14. The method of claim 1, wherein said input image data from said image sensor is digital image data.

15. An imaging device for transforming input image data from an image sensor, said input image data having a plurality of pixels corresponding to a plurality of color channels, said device comprising:
   a processing circuit configured to calculate a color channel gain for a first color channel of said plurality of color channels by dividing a sum of gray world summary chromaticity values corresponding to the other color channels of said plurality of color channels by a sum of chromaticity values representing a neutral white point; and
   a circuit configured to apply the color channel gain to said first color channel of said input image data.

16. The imaging device of claim 15, wherein said processing circuit is configured to calculate color channel gains for each other respective color channel of said plurality of color channels based on said calculated color channel gain for said first color channel.

17. The imaging device of claim 16, further comprising:
   a memory device for storing a predetermined number of said calculated color channel gains for each respective color channel,
   wherein said processing circuit is further configured to calculate an average color channel gain for each respective color channel by averaging the predetermined number of stored color channel gains for said respective color channel.

18. The imaging device of claim 15, wherein said processing circuit comprises at least one of:
   a processor;
   a logic circuit; and
   hardwired circuitry.

19. The imaging device of claim 15, wherein said input image data received by said processing circuit comprises at least one of:
   analog image data; and
   digital image data.

20. A method of calculating color channel gains for a plurality of color channels of an input image, said method comprising:
   determining a respective chromaticity value of a gray world summary for each color channel of said plurality of color channels;
   using a processing circuit to calculate a first color channel gain for a first color channel of said plurality of color channels as a function of two or more of said chromaticity values of said gray world summary and chromaticity values of a neutral white point; and
   calculating a second color channel gain for a second color channel of said plurality of color channels as a function of said first color channel gain.

21. The method of claim 20, further comprising:
   calculating a third color channel gain for a third color channel of said plurality of color channels as a function of said first and second color channel gains.

22. The method of claim 20, wherein said step of determining a respective chromaticity value of a gray world summary for each color channel of said plurality of color channels further comprises:
   selecting pixel values from said input image based on predetermined criteria; and
   dividing a sum chromaticity value of said selected pixel values for each color channel of said plurality of color channels by a sum of chromaticity values for all color channels of said plurality of color channels.

23. The method of claim 20, wherein said step of calculating said first color channel gain for said first color channel of said plurality of color channels comprises:
   dividing a sum of said chromaticity values of said gray world summary corresponding to the other color channels of said plurality of color channels by a sum of chromaticity values of said neutral white point.

24. The method of claim 20, wherein said first color channel gain is calculated as a function of said two or more chromaticity values of said gray world summary, said neutral white point, and a system tuning parameter for adjusting said first color channel gain according to characteristics of a source of the input image.

* * * * *

UNITED STATES PATENT AND TRADEMARK OFFICE
CERTIFICATE OF CORRECTION

| | | |
|---|---|---|
| PATENT NO. | : 8,180,150 B2 | Page 1 of 1 |
| APPLICATION NO. | : 12/915665 | |
| DATED | : May 15, 2012 | |
| INVENTOR(S) | : Shane C. Hu | |

It is certified that error appears in the above-identified patent and that said Letters Patent is hereby corrected as shown below:

In column 7, line 65, in Claim 7, delete " $R\_GAIN = \dfrac{\dfrac{GW\_CG}{R\_GAIN} + \dfrac{GW\_CB}{B\_GAIN}}{N\_CG + N\_CB}$ ," and insert -- $R\_GAIN = \dfrac{\dfrac{GW\_CG}{G\_GAIN} + \dfrac{GW\_CB}{B\_GAIN}}{N\_CG + N\_CB}$ , --, therefor.

In column 8, line 34, in Claim 8, delete "GW CB," and insert -- GW_CB, --, therefor.

In column 8, line 56, in Claim 9, delete "red" and insert -- red color --, therefor.

Signed and Sealed this
Seventh Day of August, 2012

David J. Kappos
*Director of the United States Patent and Trademark Office*